(12) United States Patent
Kraus et al.

(10) Patent No.: US 9,527,215 B2
(45) Date of Patent: Dec. 27, 2016

(54) FOLDING DEVICE AND FOLDING METHOD

(75) Inventors: Johann Kraus, Mertingen (DE); Reinhold Neider, Langweid (DE)

(73) Assignee: KUKA SYSTEMS GMBH, Augsburg (DE)

( * ) Notice: Subject to any disclaimer, the term of this patent is extended or adjusted under 35 U.S.C. 154(b) by 639 days.

(21) Appl. No.: 13/984,363

(22) PCT Filed: Feb. 10, 2012

(86) PCT No.: PCT/EP2012/052288
§ 371 (c)(1),
(2), (4) Date: Aug. 8, 2013

(87) PCT Pub. No.: WO2012/107553
PCT Pub. Date: Aug. 16, 2012

(65) Prior Publication Data
US 2013/0312473 A1 Nov. 28, 2013

(30) Foreign Application Priority Data

Feb. 11, 2011 (DE) .................... 20 2011 000 315 U

(51) Int. Cl.
*B25J 15/00* (2006.01)
*B21D 39/02* (2006.01)
(52) U.S. Cl.
CPC .......... *B25J 15/0019* (2013.01); *B21D 39/021* (2013.01)
(58) Field of Classification Search
CPC ..... B21D 39/02; B21D 39/021; B21D 39/023; B25J 15/0019
See application file for complete search history.

(56) References Cited

U.S. PATENT DOCUMENTS

| 2,809,540 | A | 10/1957 | Schultze |
| 8,100,133 | B2 | 1/2012 | Mintz et al. |
| 2009/0319232 | A1 | 12/2009 | Griessler et al. |
| 2010/0313621 | A1 | 12/2010 | Kumagai et al. |

FOREIGN PATENT DOCUMENTS

| CH | 348 308 A | 8/1960 |
| CN | 101321606 A | 12/2008 |
| DE | 100 11 854 A1 | 9/2001 |
| DE | 10 2007 036 704 A1 | 4/2008 |
| DE | 10 2007 045 620 A1 | 4/2009 |
| DE | 20 2008 003 687 U1 | 7/2009 |
| DE | 10 2008 029 672 B3 | 2/2010 |
| DE | 10 2009 009 964 A1 | 9/2010 |
| DE | 20 2009 005 111 U1 | 12/2010 |
| JP | 07060370 A | 3/1995 |
| KR | 10 2010 0028 349 A | 3/2010 |
| WO | 2005/056444 A2 | 6/2005 |
| WO | 2007005555 A2 | 1/2007 |

*Primary Examiner* — Teresa M Ekiert
(74) *Attorney, Agent, or Firm* — McGlew and Tuttle, P.C.

(57) ABSTRACT

A manipulator-guided folding (hemming) tool (1) includes a frame (9) having a preferably roller-shaped folding element (15, 16, 17, 17') and a connection (10) for connecting to a manipulator (2), and a detecting device (34) for the loads that occur during folding. The detecting device (34) has an indicator (38) for the loads, which indicator is arranged on the folding tool (1). The indicator is preferably designed as an optical indicator and is arranged in a tool area that is visible during folding.

20 Claims, 7 Drawing Sheets

FOLDING DEVICE AND FOLDING METHOD

CROSS REFERENCE TO RELATED APPLICATIONS

This application is a United States National Phase Application of International Application PCT/EP2012/052288 filed Feb. 10, 2012 and claims the benefit of priority under 35 U.S.C. §119 of German Patent Application DE 20 2011 000 315.9 filed Feb. 11, 2011, the entire contents of which are incorporated herein by reference.

FIELD OF THE INVENTION

The present invention pertains to a manipulator-guided folding or hemming tool, and especially a roller folding (hemming) head, and to a folding (hemming) method wherein the hemming tool has a frame with a hemming element and with a connection for connection to a manipulator or robot as well as a detecting device for the loads occurring during hemming.

BACKGROUND OF THE INVENTION

Such a manipulator- or robot-guided folding or hemming tool is known from practice. The compressive forces developing during hemming are measured with a load cell, which is arranged at the connection point between the hemming tool and the robot hand The measured load values are transmitted via cable to an external indicator, which the operator can hold in his hand, or put down at any desired site at the folding or hemming bed or elsewhere. The measured loads are indicated in numerals on a indicator. This detection technique has various drawbacks. It cannot be used optimally especially when setting up and programming a hemming robot.

SUMMARY OF THE INVENTION

An object of the present invention is to provide a folding or hemming technique with a better detection technique.

According to the invention, a manipulator-guided folding or hemming tool is provided, especially a roller folding (hemming) head. The invention is also directed to a robot with such a hemming tool and to a folding (hemming) method. The hemming tool has a frame with a hemming element and with a connection for connection to a manipulator or robot as well as a detecting device for the loads occurring during hemming. The indicator is arranged at the folding (hemming) tool.

In the folding or hemming technique being according to the invention, the indicator is arranged at the folding or hemming tool and is preferably attached permanently. This has various advantages. On the one hand, the detecting device can be used not only during set-up, but also in series production. The current load on the tool and also the robot load associated therewith can be indicated to a human operator directly at the hemming tool and hence at an optically prominent location. The recognizability of the indicator and the human operator's ability to process the information indicated are significantly improved thereby. The human operator can have the hemming tool and the indicator in his sight all the time during the set-up of a hemming robot and associate the loads being displayed directly with the hemming site at the workpiece and with the corresponding point of the path in the programmed robot path.

Furthermore, it is favorable according to a specific aspect of the present invention if the indicator is designed as a range indicator for different load ranges. The information indicated is more easily understandable and usable to the operator as a result during set-up. The operator is interested primarily in whether the hemming loads occurring and the programmed depth of penetration of the hemming tool at the workpiece are within the permissible range or not. The range indicator can convey this information to him in such a way that it can be detected rapidly and easily and in an unambiguous manner. The information can thus be utilized more rapidly and combined and processed with other information from the operation or set-up process. The additional consideration necessary in the state of the art with interpretation of the numerical values indicated is assumed by the detecting device and represents a relief for the operator as a result.

An optical indicator at a readily visible point of the hemming tool, where the range information is conveyed, e.g., by LEDs having different colors or other lights, is especially favorable from ergonomic points of view. The range indicator can also signal here in a suitable manner whether there is a contact between the hemming tool and the workpiece at all. This facilitates an operator's work substantially, especially during set-up, and offers great reliability and high quality. Furthermore, damage to the tool, e.g., lost or damaged hemming elements, e.g., hemming rollers, can be detected in time and damage that could possibly result from this can be avoided.

Another aspect of the present invention is in the manner of load detection. In case of a hemming element or hemming roller arrangement that is capable of performing yielding motions, it is possible to measure paths and calculate loads therefrom. On the other hand, the path information itself is of interest as information on the depth of penetration at the workpiece. A path-measuring device can be accommodated at any desired and suitable point of the hemming tool. This may be especially in the area of the hemming elements themselves or pertain to a mounting of the hemming elements, especially hemming rollers, which mounting is capable of performing yielding motions, at the frame of the hemming tool. However, the hemming tool as a whole may also be connected, as an alternative, to a robot hand such that it is capable of performing yielding motions, especially in a spring-loaded manner. This load detection is of independent significance and can also be used in other conventional hemming tools, which are not equipped with a load indicator or with a load indicator at another side.

Another aspect of the present invention pertains to the design of a hemming element or hemming roller mount that is capable of performing yielding motions. A mount that is capable of performing yielding motions in opposite directions and hence on both sides is proposed for this, which makes it possible to use the hemming tool for applying tensile forces and/or compressive forces during hemming. The hemming tool can be used universally as a result. This hemming element or hemming roller mount capable of performing yielding motions is of independent significance and can be used in other conventional hemming tools that are not equipped with a load indicator or with a load indicator at another site.

The hemming element or hemming roller mount capable of performing yielding motions in a plurality of directions may, moreover, be combined with a corresponding multi-axial load detection. The loads occurring can be detected in all operating situations of the hemming tool, which is of interest especially during a pulling operation, during which the hemming site is often located in a hidden area, e.g., on the inner side of a wheel well fold. The hemming tool according to the invention offers an optimal solution for a roller mount capable of performing yielding motions on both sides and for a corresponding load detection on both sides. Protected accommodation in the interior of the hemming tool is possible, and only a small space is needed. The design effort and the cost are low as well. The functions of the hemming tool are not compromised by the integrated arrangement. There are also no adverse effects on interference ranges, etc.

Furthermore, the present invention preferably makes provisions for the load detection not to be limited to the final hemming and the final hemming rollers used at that time. Problems with excessive depths of penetration or a possible overload are substantially less serious during prehemming or may even be absent altogether. Load detection may therefore possibly be done away with in that case. On the other hand, this is favorable for an integrated arrangement of the detecting devices and the roller mount capable of performing yielding motions and ensures high mechanical stability of the hemming tool due to a limitation of the wall penetrations.

The detecting device and especially its sensor system is preferably arranged in the frame and/or at a hemming element. It detects the loads and possibly torques acting on the hemming tool when the hemming tool is being fed by the manipulator to the workpiece and is pressed on in a pushing or pulling manner to apply the hemming force.

The benefit of the hemming tools and of the detecting device can be expanded by an external signal connection to a robot control or the like. This has various advantages. On the one hand, the measured values or detected values for paths and/or loads can be directly associated with the path points being stored and stored in the robot control related to the path or time. The detected value may also be analyzed and logged for quality assurance or for other purposes.

The above-mentioned aspects of the present invention may be combined with one another for an optimal solution. As an alternative, they may be used only partially or in partial combinations. In addition, the aspects of the present invention may be combined with prior-art hemming tools and also with a hemming tool according to the state of the art mentioned in the introduction. The numeral indicator may be replaced here, e.g., with a range indicator. The design of the hemming tool for tensile and compressive forces during hemming and the roller mount used for this, which is capable of performing yielding motions on both sides, may also be used in conventional hemming tools without detection and indication of the loads, especially forces or depths of penetration.

The present invention is shown schematically in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
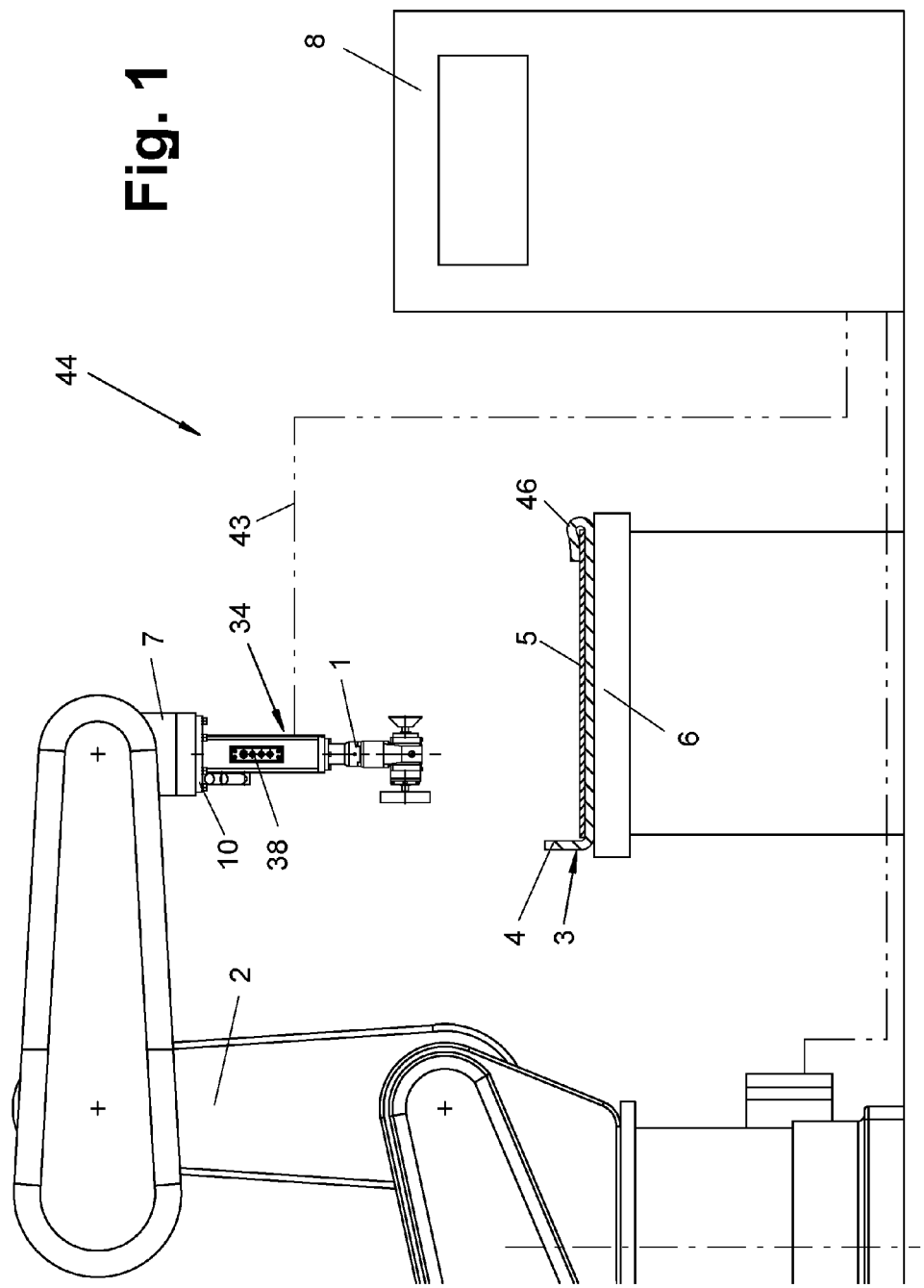
FIG. 1 is a schematic view of a robot hemming station with a robot and with a hemming tool with a detecting device and with an indicator for the loads.

Referring to the drawings in particular, the present invention pertains to a hemming tool (1), a detecting device (34) for loads occurring during hemming with an indicator (38) as well as to a robot hemming station (44). The present invention pertains, furthermore, to a hemming method and to a detection method.

The hemming tool (1) is held by a multiaxial manipulator (2) and guided relative to a workpiece (3) held stationarily or likewise movably. Manipulator (2) and hemming tool (1) are components of a robot hemming station (44) shown as an example in FIG. 1.

The multiaxial manipulator (2) is designed, e.g., as a programmable robot, which has a plurality of individually controllable rotary and/or translatory axes in any desired and suitable combination and which has a hand or robot hand (7), to which the hemming tool (1) is fastened rigidly or replaceably. Robot (2) is designed, e.g., as an articulated-arm robot with, for example, five or six rotary axes and may optionally have auxiliary axes. The manipulator or robot (2) has a robot control (8). The manipulator or robot (2) has, e.g., position-controlled robot axes or axis drives.

Figure 7:
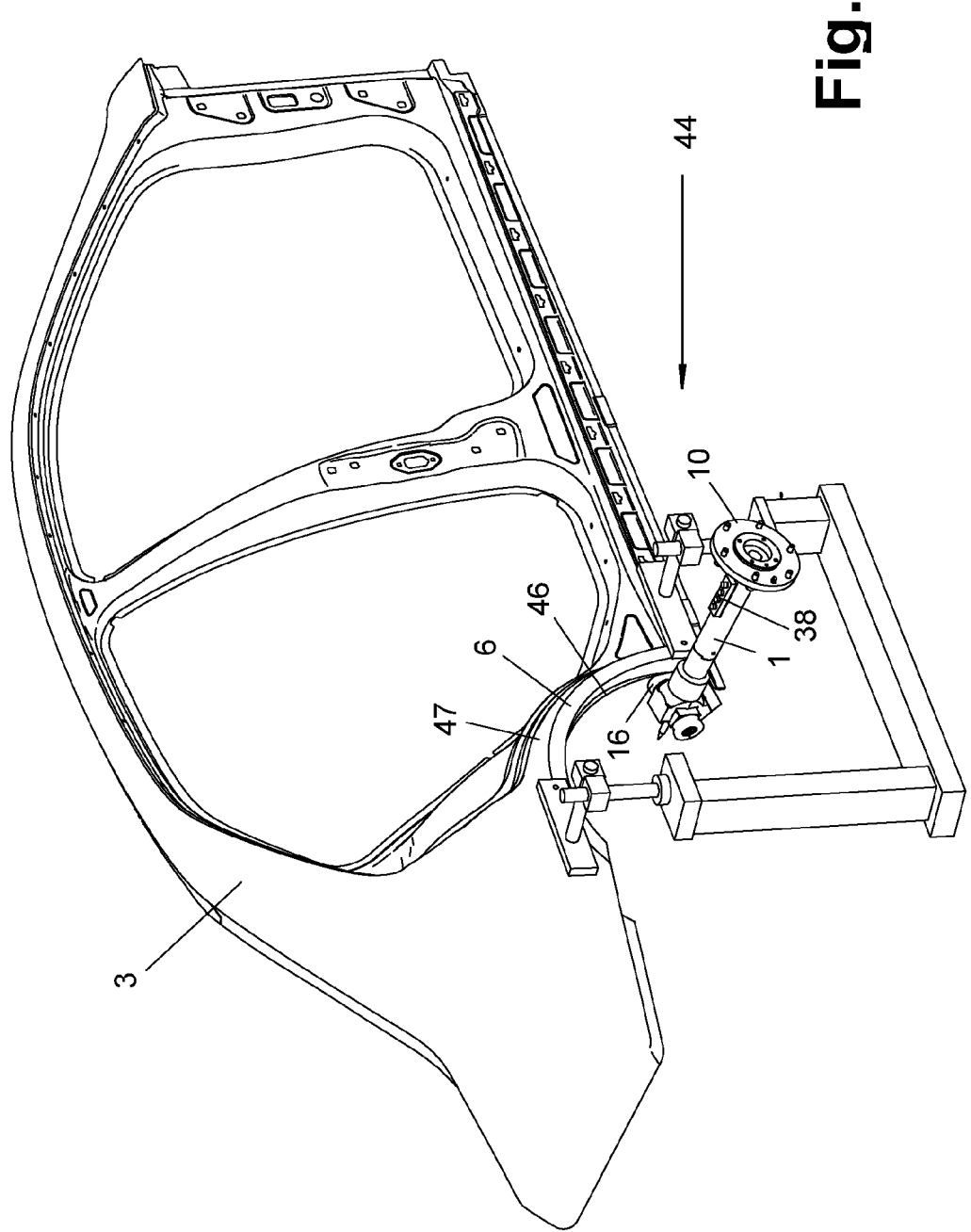
FIG. 7 is a perspective arrangement of another robot hemming station with a pulling hemming tool at a vehicle body.

FIG. 7 shows another hemming station (44), in which robot (2) is not shown for clarity's sake.

Hemming tool (1) is designed, e.g., as a roller hemming head with rolling hemming elements (15, 16, 17), but it may also have, as an alternative, another embodiment with sliding hemming elements (17') or the like. The manipulator or robot (2) moves the hemming tool (1) along a preprogrammed path relative to the workpiece (3), while a hemming process is carried out with the hemming tool (1) and a fold (46) is formed. The manipulator or robot (2) feeds the hemming tool (1) and also applies the hemming force. It presses the hemming tool (1) with a hemming element (15, 16, 17, 17') against the workpiece (3) in the process.

The hemming process may be a one-step or preferably multistep process, and a workpiece edge is bent in a plurality of steps, e.g., in a prehemming step and a final hemming step, in case of a multistep process. This may happen, as is shown in the exemplary embodiment according to FIG. 1, with pushing hemming forces.

In a simplified view, FIG. 1 shows a workpiece (3), which may have a multipart design and comprises, e.g., a lower sheet (4) and an upper sheet (5), and a projecting flange of one workpiece part (4) is bent in the hemming process, e.g., by approximately 90° or more. FIG. 1 shows at the left-hand edge of the workpiece an upwardly projecting lateral flange of the lower sheet (4), which is bent over the upper sheet (5)

while forming the fold (46) shown on the right side at the edge of the workpiece. For example, a drop flange is formed now. As an alternative, any other desired fold forms and hemming processes with, e.g., three, four or more hemming steps are possible.

The hemming tool (1) has different hemming elements for the different hemming steps, and these hemming elements are designed as freely rotatable or optionally also rotatingly driven hemming rollers (15, 16, 17) in the exemplary embodiments shown in FIGS. 1 through 8. There may be here, e.g., two prehemming rollers (15) and two final hemming rollers (16, 17), which have different jacket contours corresponding to the hemming steps.

Another form of hemming elements, comprising a combination of hemming rollers (15, 16, 17) and a hemming steel (17'), is shown in the variant according to FIG. 8, which will be explained later.

The workpiece (3) is supported on a hemming bed (6) during the hemming process. This hemming bed is arranged stationarily in the exemplary embodiment according to FIG. 1. FIG. 7 shows a variant with a movable hemming bed (6), which will be described in more detail below.

Figure 2:
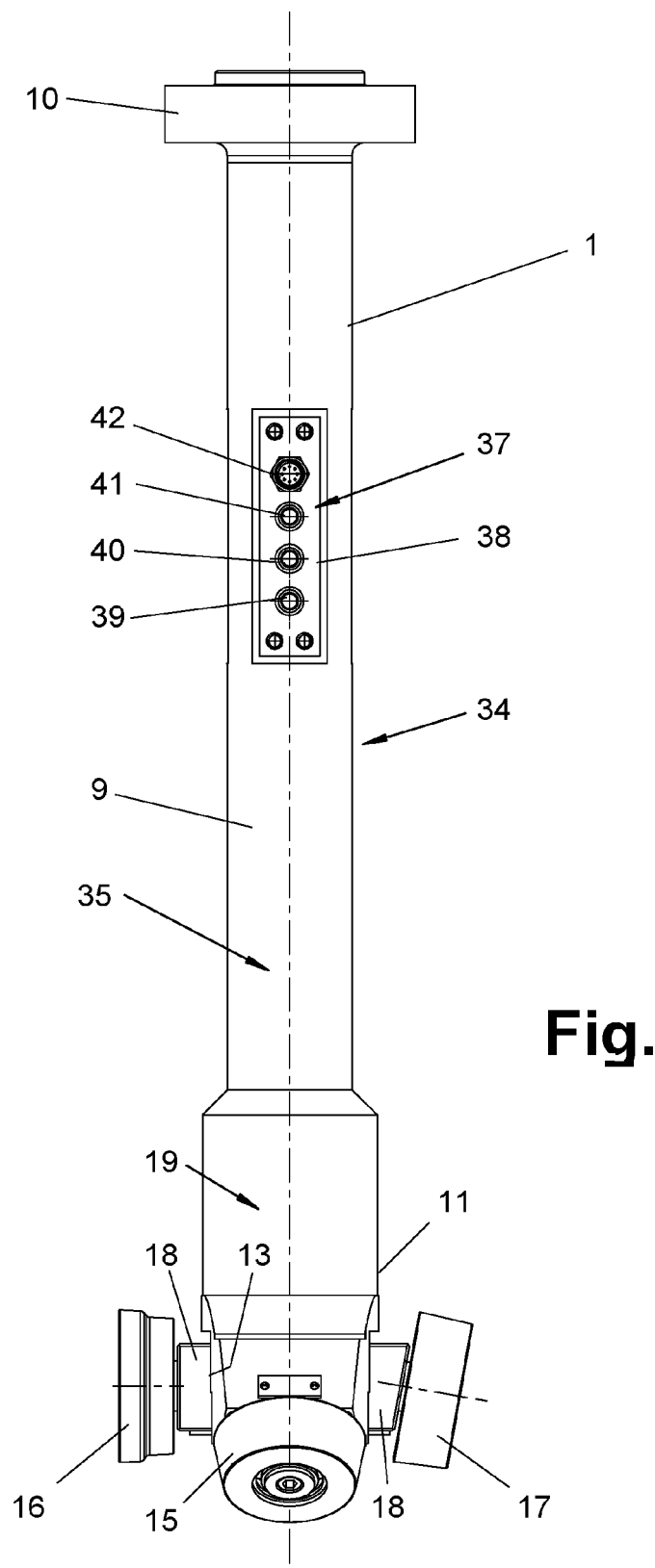
FIG. 2 is a hemming tool with an indicator in a lateral view.
Figure 3:
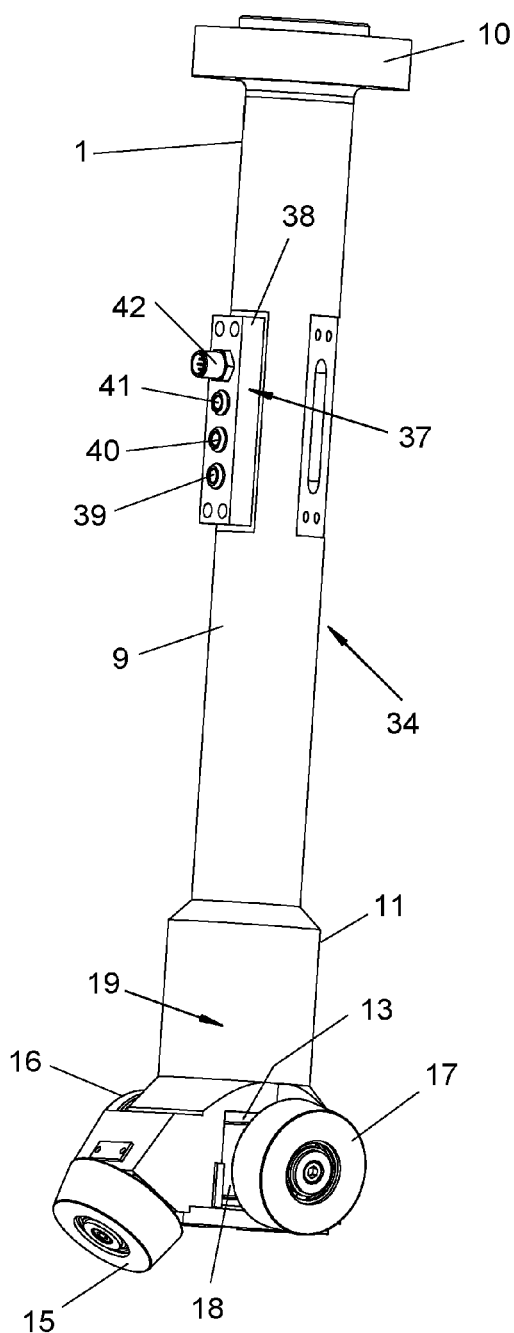
FIG. 3 is a perspective view of the hemming tool with indicator from FIG. 2.
Figure 4:
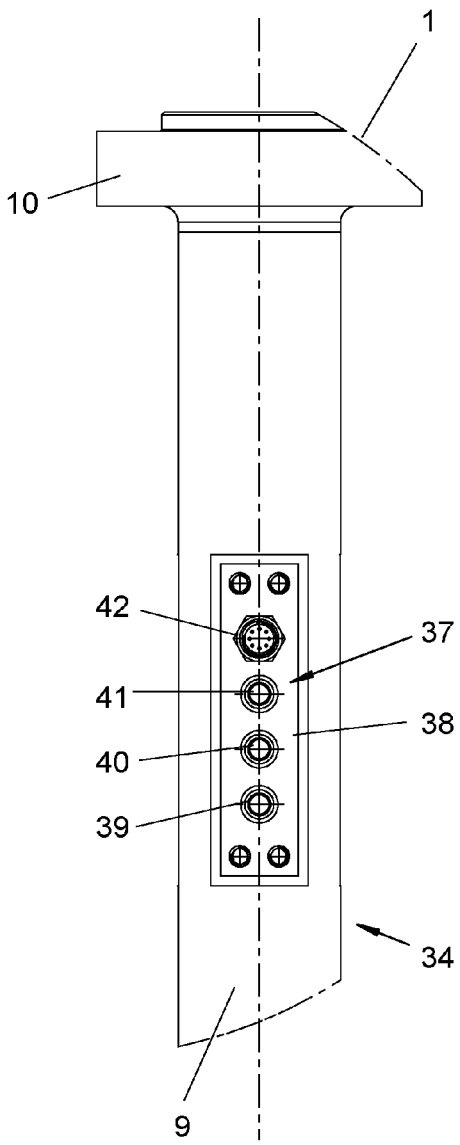
FIG. 4 is an enlarged and cut-away front view of the indicator.

FIGS. 2 through 4 show a hemming tool (1), especially a roller hemming head, in different views. The hemming tool (1) has a frame (9) with a connection (10), via which the hemming tool (1) can be connected to the robot hand (7), especially to the driven flange thereof. Media, e.g., power currents and signal currents, compressed air or the like, may possibly also be transferred (not shown) via connection (10).

Frame (9) is, e.g., of a column-like design and has the connection (10) at the upper end and a hemming element support, e.g., a roller support (11), at which said hemming rollers (15, 16, 17) are arranged, at the lower end. They are located on different sides of the roller hemming head (1). The rollers proper are arranged on roller holders (18). The final hemming rollers (16, 17) are connected to a roller mount (19) that is capable of performing yielding motions in the exemplary embodiment being shown. The prehemming roller(s) (15) is/are held, by contrast, relatively stationarily at the roller support (11) and are mounted rotatably.

In a variant of the embodiment shown, all hemming rollers (15, 16, 17) may be held relatively stationarily at the roller support (11) and mounted rotatably. However, it is also possible to provide a roller mount (19) capable of performing yielding motions for all hemming rollers (15, 16, 17). Besides, any other desired intermediate combinations of relatively stationary roller mounts and roller mounts capable of performing yielding motions are possible.

The hemming tool (1) has a detecting device (34) with an indicator (38) for detecting and indicating the loads occurring during hemming. The detecting device (34) is arranged at a suitable point of the hemming tool (1), e.g., in frame (9) and/or at a hemming element (15, 16, 17, 17'). The loads pertain, on the one hand, to forces of reaction, which are generated during hemming due to the tool feed and act on the hemming tool (1) and on the manipulator or robot (2) and especially on the axes of the robot. The loads also pertain to depths of penetration of the hemming tool (1) at the workpiece (3).

Hemming tool (1) has a so-called tool center point (abbreviated as TCP), which represents the point at which the hemming tool (1) acts on the workpiece (3) and especially on the flange (46) of the workpiece. When setting up the path of motion of robot (2), for example, a path course of the carpal point or TCP of the robot hand (7) is programmed and a distance of the TCP of the hemming tool (1) from the carpal or flange root point is now assigned to the individual path points. The programmed path course thus also contains a feed of the hemming tool (1) to the workpiece (3) in order to bring about the desired bending of the flange in the different phases of the process. Depending on the reaction and rigidity of the workpiece (3), the corresponding hemming element (17') or the hemming roller (15, 16, 17) must be fed more or less in the different hemming steps.

The initial programming takes place, e.g., offline and on the basis of the constructive data of the workpiece and the shape data of the hemming bed (6), which was finished to the corresponding precision. If it is found during a test run during the setting up of the robot hemming station (44) that the preprogrammed path course along with the feed is not sufficient for achieving and maintaining the desired bending of the flange, an operator can change and adjust the programming, especially increase the feed travel. The result obtained in a further test run is evaluated on the basis of the shape of the flange (46).

During adjustment, which is performed, e.g., by changing the TCP coefficient with the path control, the operator can at first program, unnoticed, an actual path course of the hemming tool TCP at the workpiece (3), with which this TCP is located within the workpiece (3) and with which the hemming tool (1) would penetrate too deeply into the workpiece (3). This may be a problem especially during final hemming and when the hemming end is pressed against the hemming bed (6). The hemming bed (6) and the workpiece (3) do not yield or yield only very little. In case of careless programming, excessive depths of penetration that may possibly occur are absorbed by intrinsic elasticities of the hemming tool (1) or especially of the manipulator (2). This may lead to increased wear on the manipulator or robot. The hemming rollers (15, 16, 17) and other parts of the hemming tool may also be overloaded.

Such loads are detected with the detecting device (34) and are signaled to the operator with the indicator (38). Indicator (38) is preferably designed as an optical indicator and is arranged on the outer side of the hemming tool (1) visible for the operator. It is located in an area visible during hemming, e.g., at the column-like frame (9). The indicator (38) is arranged between connection (10) and roller support (11) at the frame (9) in the embodiment being shown. Indicator (38) is connected, e.g., rigidly to the hemming tool (1).

Indicator (38) is preferably designed as a range indicator, which signals different load ranges. The indicator (38) has a plurality of different indicator elements (39, 40, 41) for this, which are designed, e.g., as lights of different colors, especially LEDs, which light up depending on the value of the detected load and of the corresponding load range. The color may be green, yellow and red, e.g., corresponding to a traffic light. For example, three different indicator elements (39, 40, 41) are used. The number of these indicator elements may be alternatively lower or higher.

The traffic light colors of the preferred embodiment signal the existence of a load and hence also of a physical contact between the hemming tool (1) and the workpiece (3) with the color green. If no LED lights up despite the programmed feed, this signals a lack of contact, which can possibly be attributed to a programming or tool error. Such a situation may arise, for example, in case of loss or rupture of a hemming roller.

The color yellow signals a range in which the occurring and measured loads are tolerable and are between a minimally permissible load and a maximally permissible load. Exceeding of the load limit can be signaled with the red color. The operator can have the indicator (38) in his sight all the time during set-up during the trial run and check whether the loads occurring are indeed within the permissible range or not. He only needs to observe whether the lights light up or not and the color and can otherwise turn his attention to other marginal conditions during set-up.

Detecting device (34) may have one or more sensors (35) for measuring a physical variable representative of the load and an analyzing means (37) connected to the sensor (35). The measured signals are received, analyzed and possibly interpreted as well as assigned to the different indicator ranges and to the corresponding indicator elements (39, 40, 41). Analyzing means (37) may be located, e.g., with the indicator elements in a housing of indicator (38). As an alternative or in addition, an analyzing means (37) may also be arranged externally.

Indicator (38) may have one or more additional parts (42). These may be, e.g., an interface shown in the drawings for an external wired or wireless signal connection (43) to another control, e.g., to the robot control (8). One part (42) may also be designed, for example, as a switch for switching on and off, as an adjusting element for the indicator (38) or the analyzing means (37) or the like.

Figure 5:
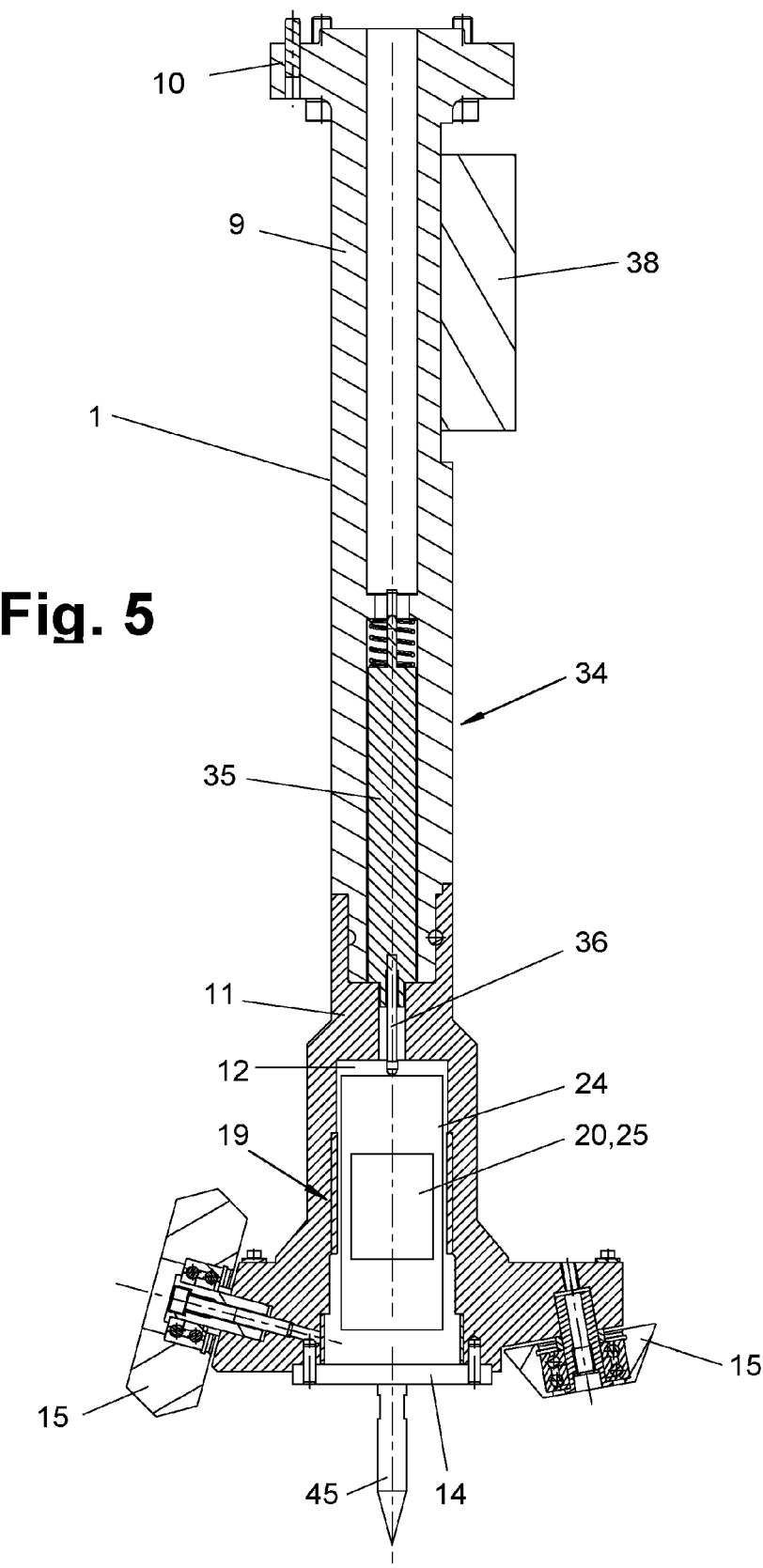
FIG. 5 is a longitudinal sectional view through the hemming tool from FIGS. 2 and 3.
Figure 6:
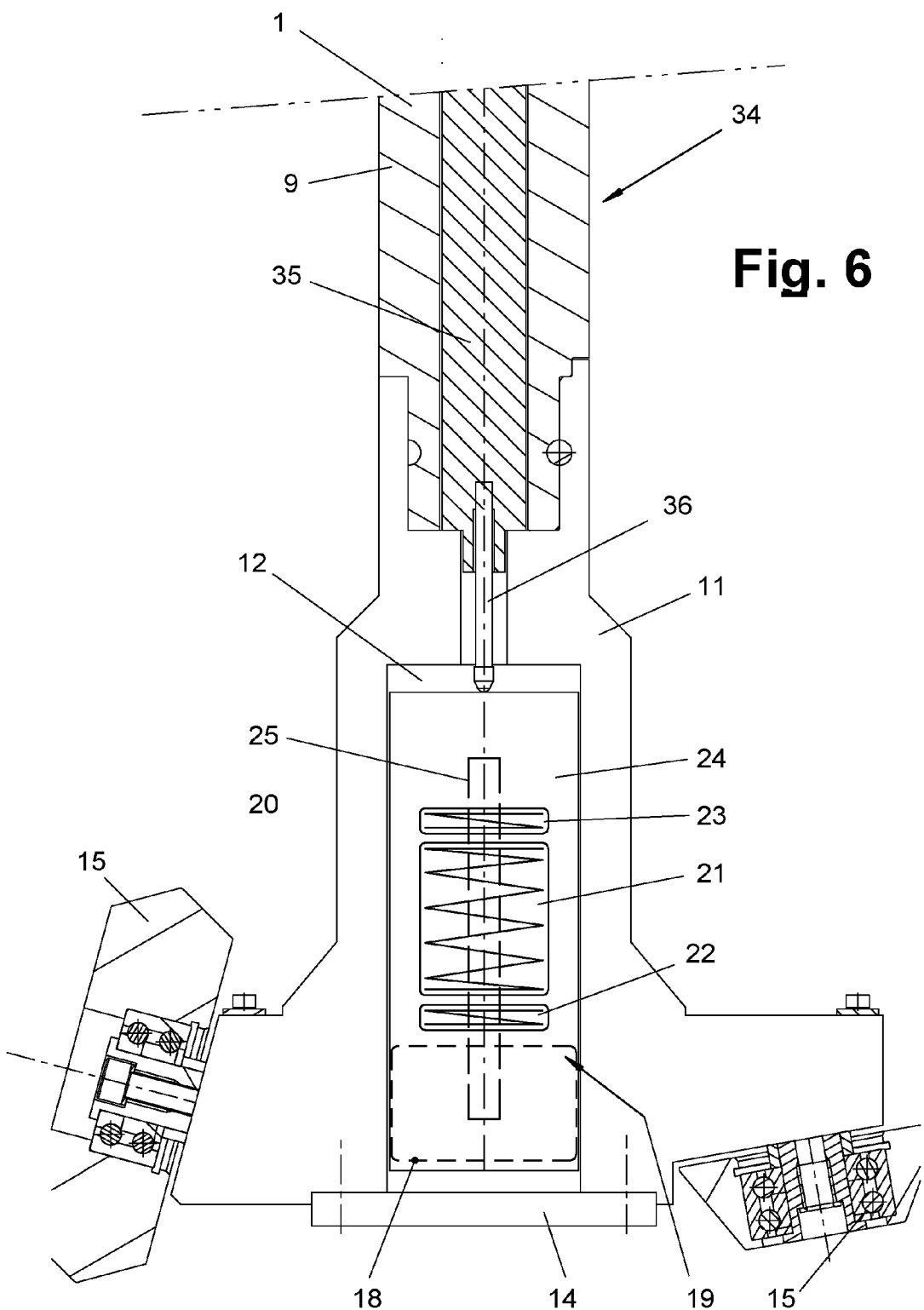
FIG. 6 is an enlarged and cut-away detail view of a roller mount of the hemming tool according to FIG. 5, which said mount is capable of performing yielding motions.

FIGS. 5 and 6 illustrate in a longitudinal section the inner workings of the hemming tool (1) and sensor (35). This sensor (35) is designed, e.g., as a position transducer and accommodated in the central interior space of the hollow frame (9). Sensor (35) may have a sensor housing, which assumes a position defined by means of a spring or the like in frame (9). An axially movable sensor (36), which picks up the yielding paths occurring, e.g., in case of a roller mount (19) capable of performing yielding motions and reports them to the analyzing means (37), which possibly transforms or converts the measured values into force values, protrudes from the sensor housing. It takes into account in the process the spring rate of the roller mount (19) capable of performing yielding motions. Analyzing means (37) may be adjustable or programmable and can thus take different preset values for tool and/or hemming process, e.g., for different spring characteristics, divisions of load and indicator ranges into account.

The roller mount (19) capable of performing yielding motions is accommodated in a hollow interior space (12) of the hemming tool (1), e.g., in the roller support (11). This roller support (11) is arranged centrally, e.g., in the essentially cylindrical interior space (12) and is directed along said longitudinal axis of the tool. It is open downward towards the hemming rollers (15, 16, 17) and is closed here by a detachably connected cover (14).

The roller mount (19) capable of performing yielding motions is provided for the final hemming rollers (16, 17) only in the exemplary embodiment being shown and is connected to the roller holders (18) thereof. The roller holders (18) pass through lateral wall openings or windows (13) of the roller support (11) into the interior space (12) and are connected to the roller mount (19) capable of performing yielding motions there.

The roller mount (19) capable of performing yielding motions has a spring arrangement (20) with a spring support (25), which is rigidly connected to the frame and to spring actuator (24) connected to the roller holder or roller holders (18).

The spring arrangement (20) has a plurality of springs (21, 22, 23) having different stiffnesses, which are connected in series according to FIGS. 5 and 6, wherein they are directed along the central axis of the hemming tool (1). A hard or stiff spring (21) is arranged between two softer or less stiff springs (22, 23). The springs (21, 22, 23) are designed, e.g., as annular springs or disk springs and are guided axially on the spring support (25).

Spring actuator (24) surrounds the spring arrangement (20) and contacts the sensor (36). The motions of the actuator are transmitted via this to sensor (35).

The shown roller mount (19) capable of performing yielding motions acts in two opposite directions, which preferably coincide with the central longitudinal axis of the hemming tool (1) and are directed in parallel thereto in another embodiment. The direction also extends along the direction of feed of hemming tool (1) against the workpiece (3) in the pushing operation according to FIG. 1 and also in the pulling operation according to FIG. 7.

When the hemming roller being acted on during hemming, especially the final hemming roller (16, 17), comes into contact with the workpiece (3) and is loaded with pushing or pulling forces because of the feed, it transmits these by means of roller holder (18) to the spring actuator (24), which is correspondingly carried and acts in the process on the spring arrangement (20) being held by the spring support (25), which is a rigid part of the frame. The spring actuator (24) is pushed upward and towards connection (10) in the pushing operation according to FIGS. 5 and 6, while it compresses at first the lower, soft spring (22). The hard spring (21) in the middle is compressed during a further motion.

These motions of the roller and actuator are transmitted to sensor (36). The soft spring (22) offers only a low resistance to the motion of the roller and actuator and can be used primarily to detect a contact between hemming tool (1) and workpiece (3), with the corresponding path of the roller or actuator being assigned to the first indicator range and, e.g., to the green LED.

The stiff middle spring (21) can be used to detect the process forces applied during hemming and dimensioned correspondingly by means of a suitable preload. The spring preload may represent the lower force threshold for hemming, especially final hemming. The upper force threshold is set, e.g., in the middle spring excursion range and before the blocked position of spring (21). It is represented by a corresponding spring excursion as well as yielding path of the spring actuator (24) and of sensor (36). The path range between the upper and lower force thresholds is connected to the middle range indicator and, e.g., with the yellow LED. After exceeding the upper force or path threshold, there is a switchover into the third indicator range and the red color.

The shown roller arrangement (19) capable of performing yielding motions and the spring actuator (24) are also active during pulling operation, in which case sensor (36) of sensor (35) is set correspondingly in the middle range of its excursion range and is under spring preload or the like.

If a pulling force acts on a hemming roller (16, 17), spring actuator (24) migrates downwards and away from connection (10), and spring actuator (24) at first compresses the upper, soft spring (23) and compresses the middle, stiff spring (21) beginning from the knock-off position. The load detection and indication corresponds to the above-described example for pushing operation.

FIG. 7 illustrates such a pulling hemming operation with a workpiece (3), which is designed as a body side panel and has a wheel well (47), on the inner side of which the flange (46) shall be formed. Hemming tool (1) enters the wheel well opening from the outside, while the hemming roller (15, 16, 17) extends behind the edge of the wheel well, presses it on the inner side and subjects the hemming tool (1)

to tensile load. The hemming forces are supported by a mobile hemming bed (6), which is in contact with the edge area of wheel well (47).

Figure 8:
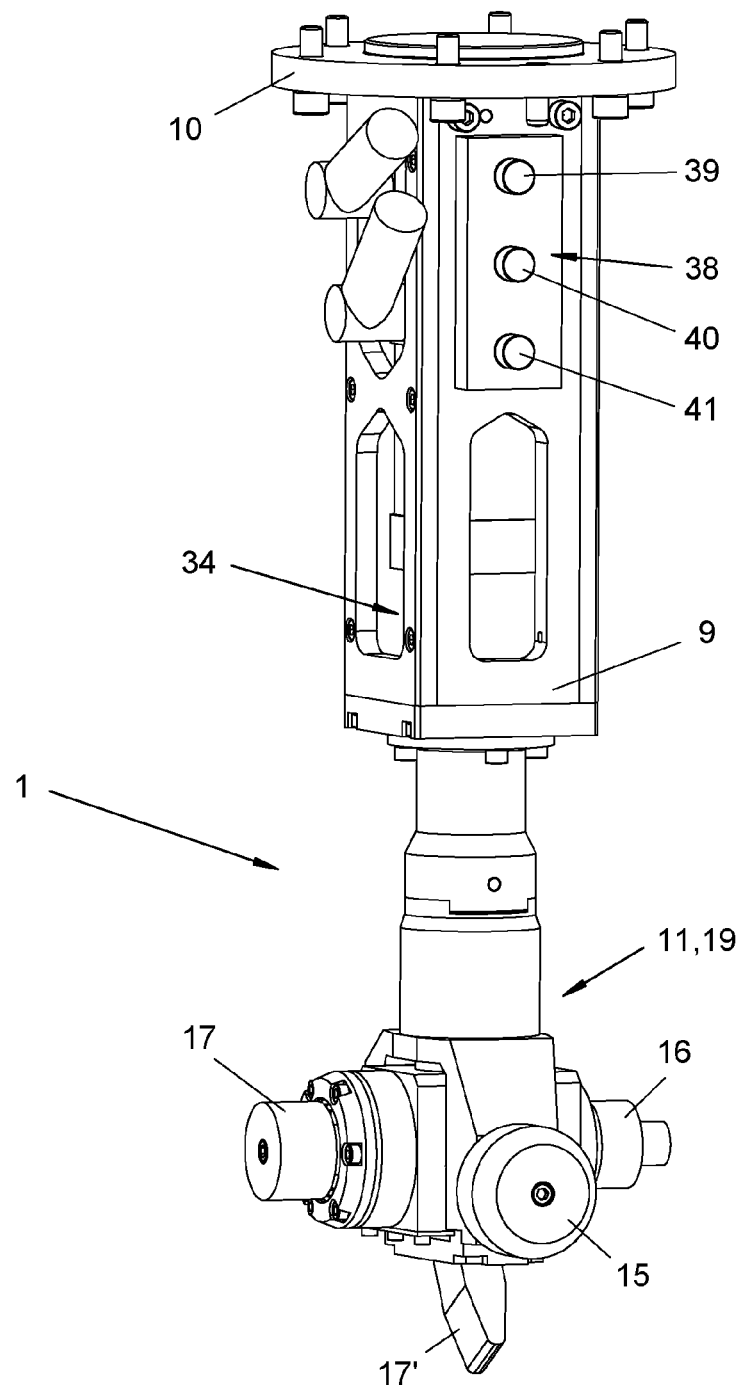
FIG. 8 is a variant of the hemming tool with other hemming elements.

FIG. 8 shows a variant of a hemming tool (1), which has different hemming elements (15, 16, 17, 17'), but otherwise may have the same design as in the above-described exemplary embodiments. A hemming element is designed in the variant being shown as a rigid and dimensionally stable hemming knife or hemming jaw (17'). Such a hemming element (17') may be used, e.g., to re-press the bent fold at especially critical points. These may be corners or sharply curved points over the course of the fold. Manipulator (2) now performs possibly only a pushing or pulling feed motion directed at right angles to the bent flange with the hemming element (17'). However, manipulator (2) may also move a correspondingly shaped rigid hemming element (17') slidingly along the course of the fold or flange and press against workpiece (3) by pushing or pulling.

In a variant of the embodiment being shown, such a hemming element (17') may also be designed as a pressure ram or draw punch, profiled jaw or the like. It may be used, in particular, especially instead of or in addition to a corner slide present in conventional hemming stations and arranged at the hemming bed. It may also be used for prehemming and final hemming.

In addition, hemming tool (1) has one or more hemming rollers (15, 126, 17) of the above-described type, which may be freely rotatable or driven, in the embodiment shown in FIG. 8. Hemming elements (15, 16, 17, 17') are arranged together on a hemming element support (11) and are directed in different directions. They are brought into working position by corresponding motions of the robot.

Hemming tool (1) may have a detecting device (34) of the above-described type, with which the forces of reaction or reaction torques introduced at the rigid hemming element (17') can also be detected by a suitable sensor system. A rigid hemming element (17') may likewise have a rigid mount or a mount of the above-described type, capable of performing yielding motions, and the detecting device (34) is adapted correspondingly. Hemming tool (1) has, besides, an indicator (38) of the above-described type, which is shown in a simplified form in FIG. 8.

FIG. 8 shows, in addition, another design of frame (9), whose upper part is designed as a rectangular housing with a partially open wall. A connection (10) is arranged on the top side of said housing and a column-like frame projection with the hemming element support (11) is flanged on, on the underside. Lines for operating materials, leading to the tool parts located on the inside, can be led through the aforementioned frame openings.

In a variant of the combination of hemming elements (15, 16, 17, 17') shown, a hemming tool (1) may do without hemming rollers and have only one or more other, e.g., rigid hemming elements (17'). Furthermore, the number and the arrangement of the hemming elements (15, 16, 17, 17') may vary.

Various variants of the embodiments shown and described are possible. On the one hand, a hemming tool designed according to the state of the art mentioned in the introduction may be equipped with a range indicator instead of with a numeral indicator. Indicator (38) may be arranged here, as in the state of the art, outside the hemming tool (1) and optionally as a mobile indicator. In another variant, an indicator (38) may be arranged at the hemming tool (1) in the above-described manner and connected to same possibly permanently, in which case the type of indicator may vary. However, a different type, number and/or arrangement of indicator elements (39, 40, 41) may be used as well. As an alternative or in addition, the type of indicator may be acoustic. A hemming tool (1) may be provided with the roller mount (19) shown, capable of performing yielding motions in a plurality of directions, without detecting device (34) and without indicator (38) in another variant.

Furthermore, it is possible in one variant to combine the detecting device (34) and the indicator (38) with a roller mount capable of performing yielding motions in one direction only. In addition, it is possible to vary sensor (35), which is present as one sensor or as a plurality of sensors and to provide, e.g., a combination of a displacement sensor and a load sensor, which are optionally arranged at different points of the hemming tool (1). For example, a force sensor in the form of a load cell, a wire strain gauge arrangement (WSG) or the like may be arranged here in the area of roller support (11) or of a possibly stationary and also rotatable roller mount. A roller mount capable of performing yielding motions may possibly be done without now. Furthermore, the design embodiment of a roller mount (19) capable of performing yielding motions is variable as well. This may also be arranged outside frame (9) or roller support (11). The hemming rollers may possibly also have mounts of their own that are capable of performing yielding motions.

While specific embodiments of the invention have been shown and described in detail to illustrate the application of the principles of the invention, it will be understood that the invention may be embodied otherwise without departing from such principles.

The invention claimed is:

1. A manipulator-guided hemming tool, comprising:
   a frame;
   a hemming element;
   a manipulator robot connection for connection to a manipulator or robot;
   a load detecting device for detecting loads occurring during hemming, wherein the load detecting device has a load indicator indicating loads and the indicator is arranged at the hemming tool and the load indicator is configured to indicate, at the hemming tool, loads detected by the detecting device.

2. A hemming tool in accordance with claim 1, wherein the indicator comprises an optical indicator arranged in an area visible during hemming on an outside of the hemming tool.

3. A hemming tool in accordance with claim 1, wherein the indicator comprises a range indicator for different load ranges.

4. A hemming tool in accordance with claim 1, wherein the indicator has a plurality of different indicator elements including lights of different colors.

5. A hemming tool in accordance with claim 1, wherein the detecting device is arranged in, on or at the frame and/or at a hemming element of the hemming tool.

6. A hemming tool in accordance with claim 1, wherein the detecting device detects and indicates only the loads occurring during final hemming.

7. A hemming tool in accordance with claim 1, further comprising a spring arrangement comprising at least one spring and at least another hemming element to provide a plurality of hemming elements wherein the hemming elements comprise a hemming element arrangement connected to the manipulator robot connection via the spring arrangement whereby the plurality of hemming elements of the hemming element arrangement perform yielding motions, wherein the detecting device measures a yielding path of the hemming element arrangement.

8. A hemming tool in accordance with claim 1, wherein the hemming tool is designed for pulling and pushing hemming forces and has a mount capable of performing yielding motions in opposite directions for one or more hemming elements, especially hemming rollers, whereby the detecting device measures the yielding path in both directions and the detecting device has a sensor connected to the mount for displacement measurement.

9. A hemming tool in accordance with claim 8, wherein the mount capable of performing yielding motions for one or more hemming elements, has a spring arrangement with a plurality of springs having different stiffnesses.

10. A hemming tool in accordance with claim 1, wherein the detecting device has an analyzing means for converting measurement displacement values into force values and/or for assigning values to different indicator ranges.

11. A hemming tool in accordance with claim 1, further comprising an external control signal connection, wherein the detecting device has the signal connection to the external control.

12. A hemming tool in accordance with claim 1, further comprising a spring arrangement comprising at least one spring directed along a central axis of the hemming tool and configured for the hemming element to perform yielding motions along a yielding path of the hemming element wherein the detecting device measures the yielding path of the hemming element.

13. A hemming tool in accordance with claim 1, wherein the frame has a column shape and is connected to the manipulator robot connection at an upper end of the column shape and connected to a hemming element support at a lower end of the column shape, the hemming element support supporting the hemming element.

14. A hemming tool in accordance with claim 1, further comprising at least another hemming element to provide a plurality of hemming elements with each of the plurality of hemming elements having one of different contours and being for one of different hemming steps, wherein each of the hemming elements is arranged at a side of the hemming tool whereby an orientation of the hemming tool is changed to position one of the plurality of hemming tools for hemming.

15. A robot hemming station comprising a multiaxial manipulator comprising a programmable robot, and the robot hemming station further comprising a hemming tool arranged on the manipulator, the hemming tool comprising:
 a frame;
 a hemming element connected to the frame;
 a robot connection, connected to the frame, for connection to a manipulator; and
 a load detecting device for detecting loads occurring during hemming, wherein the load detecting device has a load indicator indicating loads, wherein the load indicator is arranged at the hemming tool and the load indicator is configured to indicate, at the hemming tool, loads detected by the detecting device.

16. A robot hemming station in accordance with claim 15, wherein the indicator comprises an optical indicator arranged in an area visible during folding on the hemming tool.

17. A robot hemming station in accordance with claim 15, wherein the indicator comprises a range indicator for different load ranges, whereby the indicator has a plurality of different indicator elements including lights of different colors.

18. A method for hemming workpieces, the method comprising the steps of:
 providing a hemming tool comprising a frame, a hemming element connected to the frame, a robot manipulator connection, connected to the frame, for connection to a manipulator or robot and a load detecting device for detecting loads occurring during hemming, wherein the load detecting device has a load indicator indicating loads and the load indicator is arranged at the hemming tool and configured to indicate, at the hemming tool, loads detected by the detecting device;
 guiding, the hemming tool with a manipulator or robot, wherein the hemming tool frame and robot manipulator connection connect the hemming element to the manipulator or robot;
 pressing the hemming element, with the manipulator or robot, against at least one of the workpieces;
 detecting loads occurring during hemming with the load detecting device; and
 indicating the detected loads, wherein the loads, detected with the detecting device, are indicated at the indicator arranged at the hemming tool.

19. A method in accordance with claim 18, wherein the loads of the hemming tool are detected at the frame or at the hemming element.

20. A method in accordance with claim 18, wherein the loads are indicated optically.

* * * * *